United States Patent
Yu et al.

(10) Patent No.: US 11,627,036 B2
(45) Date of Patent: Apr. 11, 2023

(54) SMART FAILOVER OF REDUNDANT NETWORK IP BASED ON REDUNDANT COMPUTER

(71) Applicant: CASCO SIGNAL CO., LTD., Shanghai (CN)

(72) Inventors: Yan Yu, Shanghai (CN); Zhijun Ji, Shanghai (CN); Haodong Liu, Shanghai (CN); Liang Chen, Shanghai (CN); Chen Liu, Shanghai (CN); Mingwang Xu, Shanghai (CN); Limin Ning, Shanghai (CN); Xin Li, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 207 days.

(21) Appl. No.: 17/285,000

(22) PCT Filed: Oct. 10, 2020

(86) PCT No.: PCT/CN2020/120120
§ 371 (c)(1),
(2) Date: Apr. 13, 2021

(87) PCT Pub. No.: WO2021/169311
PCT Pub. Date: Sep. 2, 2021

(65) Prior Publication Data
US 2022/0311658 A1   Sep. 29, 2022

(30) Foreign Application Priority Data

Feb. 26, 2020   (CN) .......................... 202010119506.X

(51) Int. Cl.
*G06F 15/16* (2006.01)
*H04L 41/0654* (2022.01)
(Continued)

(52) U.S. Cl.
CPC ...... *H04L 41/0654* (2013.01); *H04L 41/0836* (2013.01); *H04L 41/12* (2013.01); *H04L 43/0823* (2013.01); *H04L 61/5007* (2022.05)

(58) Field of Classification Search
CPC . H04L 41/0654; H04L 41/0836; H04L 41/12; H04L 43/0823; H04L 61/5007;
(Continued)

(56) References Cited

U.S. PATENT DOCUMENTS 8,180,891 B1 * 5/2012 Harrison ................. H04L 67/02
709/224
10,397,189 B1 * 8/2019 Hashmi ............... H04L 63/0272
(Continued)

FOREIGN PATENT DOCUMENTS

CN   101662351 A   3/2010
CN   101873223 A   10/2010
(Continued)

OTHER PUBLICATIONS

China National Intellectual Property Administration, (First) Search Report for China Patent Application No. 202010119506.X, dated Feb. 22, 2021, 2 pp., China.
(Continued)

*Primary Examiner* — Karen C Tang
(74) *Attorney, Agent, or Firm* — Amster, Rothstein & Ebenstein LLP

(57) ABSTRACT

A redundant network IP smart failover method and system based on a redundant computer. Each computer in any computer group comprises an IP address switching module, a network status detecting module, and a peer fault detecting module. The IP address switching module is configured to smoothly switch an IP address in the redundant network. The peer fault detecting module is configured to mutually exclusively and stably acquire operation statuses of peer comput-
(Continued)

ers and quickly obtain a correct redundant network IP when necessary. The network status detecting module is configured to determine statuses of local and remote networks to facilitate the IP address switching module to smartly switch the IP address. Configuring a network status detecting module and a peer fault detecting module to aid the IP address switching module to allocate IP addresses more smartly can significantly improve reliability of the redundant network and effectively reduce IP conflicts during the redundant network failover process.

13 Claims, 2 Drawing Sheets

(51) Int. Cl.
  *H04L 61/5007* (2022.01)
  *H04L 41/0823* (2022.01)
  *H04L 41/12* (2022.01)
  *H04L 43/0823* (2022.01)
  *G06F 15/173* (2006.01)

(58) Field of Classification Search
  CPC ............ H04L 41/0663; H04L 61/5038; H04L 2101/668; H04L 2101/677; H04L 43/0817
  USPC ........................................................ 709/224
  See application file for complete search history.

(56) References Cited

U.S. PATENT DOCUMENTS

| | | | |
|---|---|---|---|
| 11,025,483 B1* | 6/2021 | Hashmi | H04L 63/164 |
| 2008/0215714 A1 | 9/2008 | Shimmura et al. | |
| 2016/0210209 A1* | 7/2016 | Verkaik | G06F 11/2028 |
| 2016/0227265 A1* | 8/2016 | Harrison | H04L 63/10 |
| 2017/0118041 A1* | 4/2017 | Bhattacharya | H04L 41/0895 |
| 2017/0207963 A1* | 7/2017 | Mehta | H04L 49/3063 |
| 2020/0236046 A1* | 7/2020 | Jain | G06F 9/45558 |

FOREIGN PATENT DOCUMENTS

| | | |
|---|---|---|
| CN | 101989903 A | 3/2011 |
| EP | 1480404 A2 | 11/2004 |

OTHER PUBLICATIONS

China National Intellectual Property Administration, (Second) Search Report for China Patent Application No. 202010119506.X, dated Apr. 23, 2021, 2 pp., China.
Government of the People's Republic of Bangladesh, Examination Report for Patent Appl. No.—383/2020/9197, dated Dec. 9, 2021, 1 p., Bangladesh.

* cited by examiner

SMART FAILOVER OF REDUNDANT NETWORK IP BASED ON REDUNDANT COMPUTER

CROSS-REFERENCE TO RELATED APPLICATIONS

This application is a U.S. national stage entry under 35 U.S.C. § 371 of PCT International Patent Application No. PCT/CN2020/120120, filed Oct. 10, 2020, which claims priority to Chinese Patent Application No. 202010119506.X, filed Feb. 26, 2020, the contents of each of which are incorporated herein by reference in their entirety.

TECHNICAL FIELD

Embodiments of the present disclosure relate to a method and a system for redundant computer-based smart allocation and failover of an IP address in a safe redundant network.

BACKGROUND

In the industrial control field which is highly reliable and highly safe, each computer group in a distributed computer system comprises a plurality of computers (usually two), while communication between the computer groups requires redundant network configurations (usually two standalone network segments), such that when one computer or network fails, the whole distributed system can still operate normally in concert.

A plurality of computers in a computer group are generally warm standby and redundant with respect to each other, i.e., when one computer serves as master, the peer computer(s) as backup(s) is also in an active state; a dedicated channel is provided between the master and the backup(s) for synchronizing information and status, such that when the master fails, a (the) backup may be promptly promoted as new master. As each computer in the computer group can be master, the computer responsible for communicating with the peer computer(s) in the redundant network is not fixed in the computer group, i.e., the redundant network port(s) of each computer is ready for IP address failover in time, which are conventionally implemented by the following two practices:

First, a communication front-end processor is additionally configured for the computer group. The front-end processor isolates the computer group from the public network in the distributed system and thus serves as a relay station for network transmission. An advantage offered by such a practice is that the processing is simplified without considering a complex IP failover mechanism. However, if the front-end processor as a non-redundant device fails, the native computer group would become unusable, lowering system reliability.

Second, as disclosed in the patent No. CN101662397B, computer network ports in the computer group are directly connected to the network in the distributed system, but functions of the network are differentiated by public and private IP addresses, wherein the public IP address is configured for communicating with other computer groups in the distributed system, and the private IP address is configured for sharing data between the master and the backup(s) in the native computer group. In normal circumstances, the public IP address is distributed on different computers to an utmost extent, such that when the master fails, the backup(s) obtains the public IP of the former master during the course of promoting one (the) backup to new master. This practice saves the expense for the communication front-end processor and offers a higher system reliability. However, it has a complex logic design, such that in particular circumstances, the operation tends to be conservative, not so smart. For example, in order to avoid the risk of IP conflicts on the public network, information check between the plurality of computers in the native computer group is always required during the IP failover process; once the information check channel fails, the act of obtaining the public IP will suspend, deteriorating the redundancy effect.

SUMMARY OF THE INVENTION

Built upon the second practice discussed above, the present disclosure provides a method and system for smart failover of a redundant network IP based on a redundant computer. By additionally providing a network status detecting module and a peer fault detecting module to facilitate an IP address switching module to assign an IP address more smartly, network usability of the computer group is further enhanced.

A technical solution of the present disclosure provides a redundant network IP failover system based on a redundant computer, wherein in an applicable distributed computer system, redundant computer groups communicate with each other via a plurality of network segments of a redundant network, wherein any redundant computer group includes a plurality of computers, each computer comprising an IP address switching module configured to assign an IP address to a network port and switch a redundant network IP to the network port, each computer communicating with a remote device in the redundant network via a public IP address while sharing data with peer computers in the redundant computer group via a private IP address;

each computer further comprising:

a peer fault detecting module configured to monitor, in real time, operation statuses of peer computers in the redundant computer group, and when determining operation exception of a peer computer, notify the IP address switching module of the native computer to obtain the public IP address held by the exceptional peer computer, such that the native computer continues operation with the public IP addresses corresponding to multiple network segments;

and/or, a network status detecting module configured to perform status detection to network ports of the native computer so as to determine status of the local network; and when determining status exception of a network port holding a public IP address on the native computer, notify the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

Optionally, when identifying status exception of the network port holding the public IP address corresponding to the first network segment on the native computer, the network status detecting module notifies the IP address switching module of the native computer to release the public IP address corresponding to the first network segment, such that by information check between the IP address switching module of the native computer and the IP address switching modules of the peer computers in the native redundant computer group, the normal status network ports corresponding to the first network segment on the peer computers obtain the released public IP address corresponding to the first network segment.

Optionally, when identifying status exception of the network port holding the public IP address corresponding to the first network segment on the native computer, the network status detecting module notifies the IP address switching module of the native computer to release the public IP address corresponding to the first network segment on the network port, and assigns a private IP address corresponding to the first network segment to the network port.

Optionally, when the network status detecting module identifies status exception of the network port holding the public IP address corresponding to the first network segment on the native computer and a normal status network port corresponding to another network segment is present on the native computer, the network status detecting module notifies the IP address switching module of the native computer to release the public IP address corresponding to the first network segment, such that by information check between the IP address switching module of the native computer and the IP address switching modules of the peer computers in the native redundant computer group, the public IP addresses corresponding to said another network segment on the peer computers are obtained and assigned to the normal status network port corresponding to said another network segment on the native computer.

Optionally, the network status detecting module of each computer is further configured to detect health statuses of a remote device corresponding to different network segments in the redundant network by monitoring network connected/disconnected conditions of other redundant computer groups;

if the network status detecting module determines that the health status of the remote device corresponding to the first network segment is better than that corresponding to other network segments, the IP address switching module of the native computer is enabled to perform IP failover corresponding to the other network segments, but forbidden to simultaneously perform IP failover corresponding to the first network segment;

and if the network status detecting module determines that the health status of the remote device corresponding to the first network segment is worse than that corresponding to other segments, the IP address switching module of the native computer is forbidden to perform IP failover corresponding to the other network segments.

Optionally, a mutually exclusive acquisition channel is provided between the peer fault detecting module of each computer and the peer fault detecting modules of the peer computers in the native redundant computer group;

and the peer default detecting module monitors a relay rear node of the peer computers in the native redundant computer group, and when stably acquiring that the flag bit for the relay rear node of the peer computers is 1, determines that the peer computers have an operation exception.

Optionally, during normal operation, the computers in the redundant computer group maintain synchronization of data information via public and private networks and existing communication channels.

A redundant network IP failover method based on a redundant computer according to the present disclosure is implemented using the redundant network IP failover system discussed above.

Another technical solution of the present disclosure is to provide a redundant network IP failover method based on a redundant computer, wherein any redundant computer group includes a first computer and a second computer, and communicates with other redundant computer groups via two network segments of a redundant network;

during normal operation, respective IP address switching module of the first computer and the second computer allocates public IP addresses of two network segments uniformly to the first computer and the second computer;

respective peer default detecting module of the first computer and the second computer monitors operation status of each other in real time, wherein when determining operation exception of the second computer, the peer fault detecting module of the first computer notifies the IP address switching module of the first computer to obtain the public IP address corresponding to the second network segment held by the second computer, such that the first computer continues operation with the public IP addresses of the two network segments;

and/or, respective network status detecting module of the first computer and the second computer monitors network status of the native computer in real time, wherein when determining fault of a network port corresponding to the first network segment in the first computer, the network status detecting module of the first computer notifies the IP address switching module of the first computer to release the public IP address corresponding to the first network segment, such that the IP address switching module of the second computer enables the second computer to obtain the public IP address corresponding to the first network segment so as to continuously maintain dual-network communication of the redundant computer group with the outside.

Optionally, the peer default detecting module of the first computer determines operation exception of the second computer when stably acquiring that the flag bit for the relay rear node of the second computer is 1, and then notifies the IP address switching module of the first computer to obtain the public IP address corresponding to the second network segment, such that the first computer continues operation with the public IP addresses of the two network segments;

when the network status detecting module of the first computer determines fault of the network port corresponding to the first network segment in the first computer, but normality of the network port corresponding to the second network segment in the first computer, the second computer transfers the public IP address corresponding to the second network segment held by the second computer to the first computer.

Optionally, when the network status detecting module of the first computer determines fault of the network port corresponding to the first network segment in the first computer but normality of the network port corresponding to the second network segment in the first computer, the network status detecting module of the second computer further identifies health statuses of a remote device corresponding to the first network segment and the second network segment:

in the case that the network status detecting module of the second computer determines that the health status of the remote device corresponding to the first network segment is better than that corresponding to the second network segment, IP failover corresponding to the second network segment is allowed;

in the case that the network status detecting module of the second computer determines that the health status of the remote device corresponding to the first network segment is worse than that corresponding to the second network segment, IP failover corresponding to the second network segment is forbidden.

Compared with the prior art, the present disclosure offers the following advantages:

1) the public IP addresses can be reallocated based on current network health statuses of the redundant computers in the computer group, which improves system redundancy;

2) IP failover can be executed smoothly based on the current network health status of a remote computer group, which avoids occurrence of transient dual-network interruption.

3) with the mutually exclusive acquisition technology, IP failover can be still executed correctly when the channel for mutual information check between redundant computers is untrustworthy, which improves system reliability.

4) the peer fault detecting module has a quicker response capacity than conventional information check channels, which reduces the probability of IP failover over time.

DETAILED DESCRIPTION OF EMBODIMENTS

Figure 1:
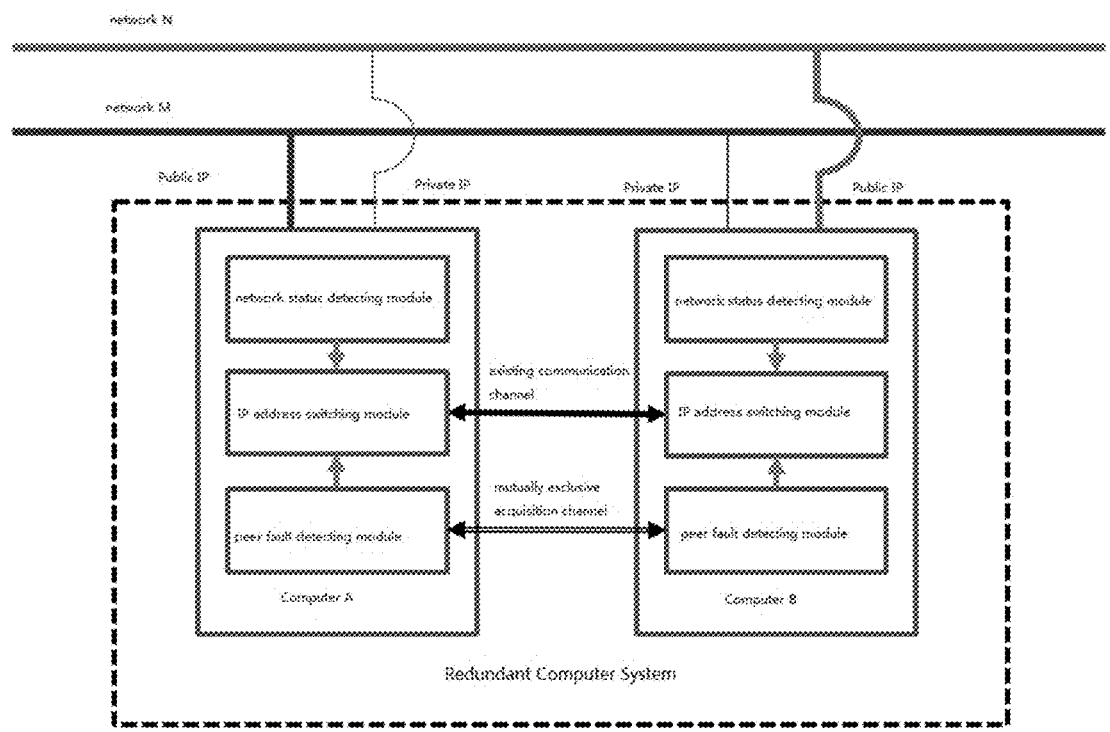
FIG. 1 is a schematic diagram of operation of an IP address switching module in a normal condition.

Hereinafter, the present disclosure will be described in detail through preferred embodiments with reference to the accompanying drawings.

The present disclosure provides a method and a system for smart failover of a redundant network IP based on a redundant computer, wherein an applicable distributed computer system includes a plurality of computer groups, each computer group including a plurality of warm standby and redundant computers, and communication between the computer groups further requires redundant network configurations.

For any computer group, each computer therein comprises: an IP address switching module, a network status detecting module, and a peer fault detecting module, wherein the IP address switching module is configured to smoothly switch an IP address in the redundant network; the peer fault detecting module is configured to mutually exclusively and stably acquire operation statuses of peer computers and quickly obtain a correct redundant network IP when necessary; and the network status detecting module is configured to determine status of the local network and status of the remote network to facilitate the IP address switching module to smartly switch the IP address.

Specifically, the redundant computer determines the current network status via the network status detecting module to perform smooth IP switching via the IP address switching module. In addition, the redundant computer per se can accurately determine exception of its peer via the peer fault detecting module so as to facilitate the IP address switching module to complete switching, enabling maintenance of network redundancy to the utmost extent.

The IP address switching module can reasonably allocate the IP addresses for respective physical network ports in the redundant computer under different network environments, wherein the public IP address is responsible for communicating with a remote device in the redundant network, and the private IP address is responsible for sharing data with respective peer computers in the redundant computer group.

The network status detecting module may identify the current physical connected/disconnected statuses of network ports and notify the statuses to the IP address switching module so as to assign a private IP to a status exceptional network port, and finds a network port with a better status in the redundant computer so as to assign a public IP address to said network port. In addition, the network status detecting module may be further configured to detect health statuses corresponding to different network segments of the remote device in the redundant network to prevent occurrence of transient dual-network interruption during the IP failover process.

With a mutually exclusive acquisition technology, the peer fault detecting module may accurately identify exceptional status of a peer computer when the peer computer in the redundant computer fails accidentally and facilitate the IP address switching module to perform IP failover, which not only avoids IP conflicts, but also enhances robustness of the redundant network.

Hereinafter, the present disclosure will be further illustrated with a redundant environment in which the computer group includes two computers, A and B, and the distributed system includes two public networks, M and N.

Suppose a scenario in which computers A and B operate normally and the communication channel therebetween operates normally. The respective IP address switching module of computers A and B uniformly assigns public IP addresses of network M and network N to the two computers, guaranteeing that when one computer fails, the other computer still performs a normal communication with other computer groups in the distributed system.

As shown in FIG. 1, computers A and B in the redundant computer group operate normally; the respective IP address switching module of computers A and B uniformly assigns the public IP addresses to different computers: computer A holds the public IP address of network M and the private IP address of network N; computer B owns the private IP address of network M and the public IP address of network N. In this way, network redundancy is guaranteed to the maximum extent.

With computer A as an example, computer A maintains synchronization of data information with computer B via the public and private networks and existing communication channels. The network status detecting module of computer A monitors network health statuses of computer A and the remote device in real time; the peer fault detecting module of computer A monitors operation status of computer B in real time; such status information provides an aid to the IP address switching module and provides a basis for executing IP failover.

The respective network status detecting module of computer A and computer B performs status detection to network ports of respective native computers; if it is detected that data transmission/reception of a network port has been interrupted, it is believed that the status of the network port is exceptional, e.g., the network cable is plugged out, the switch port corresponding to the network cable fails, etc. When the network state detection module identifies status exception of the network port holding the public and private IP addresses, it will notify the respective IP address switching module of the computers; after the IP address switching modules of computer A and computer B check information with each other, if it is found that another network port in the same network has a normal status, then such another network port is assigned the public IP address.

Meanwhile, the network status detecting module may further monitor network connected/disconnected conditions of other computer groups in the distributed system (the computer group devices in the same network are communicable with each other; with the native computer as a recipient, if it can receive data from a remote device address, it is believed that the remove device at that address has a healthy network), and then determines which of the public networks M and N is more healthy (illustratively, each of the redundant networks M and N includes computer groups X1, X2, X3, X4, and X5; for X1, the remote-end condition is that: network M of X2 is disconnected, network M of X3 is connected, network M of X4 is connected, network M of X5 is connected; network N of X2 is disconnected, network N of X3 is connected, network N of X4 is connected, network N of X5 is disconnected. That is, in this example, the network N connection devices (X3, X4) are included in the network M connection devices (X2, X3, X4, X5); then it is believed that network M is healthier than network N).

Supposing that network M is healthier than network N, in order to prevent affecting communication of the remote device during the IP failover process (transient dual-network interruption risk), the network status detecting module allows the IP address switching module to perform IP failover corresponding to network N, but forbids simultaneous IP failover corresponding to network M.

The respective peer fault detecting module of computers A and B leverages a relay acquisition technology: the acquisition characteristics of the front and rear nodes of the relay are embodied such that the front and rear nodes are mutually exclusive at the same time, e.g., when the front node acquisition is high level 1, the rear node acquisition is low level 0. Operation statuses of the computers will be reflected on the relay. When the computers operate normally, the flag bit for the front node of the relay is 1 while the flag bit for the rear node of the relay is 0; when the computers are down (serious error in system operation, hardware damage, accidental shutdown, etc.), the flag bit for the front node of the relay is 0, while the flag bit for the rear node is 1. The respective peer fault detecting module of computers A and B cross-monitor the rear node of the peer relay, such that even the existing communication channel between computers A and B becomes unusable, computer A can also accurately know whether computer B has been down and instruct the IP address switching module as to whether to obtain the public IP address originally held by computer B. This practice not only improves network redundancy, but also avoids IP conflicts caused by mistaken failover.

Figure 2:
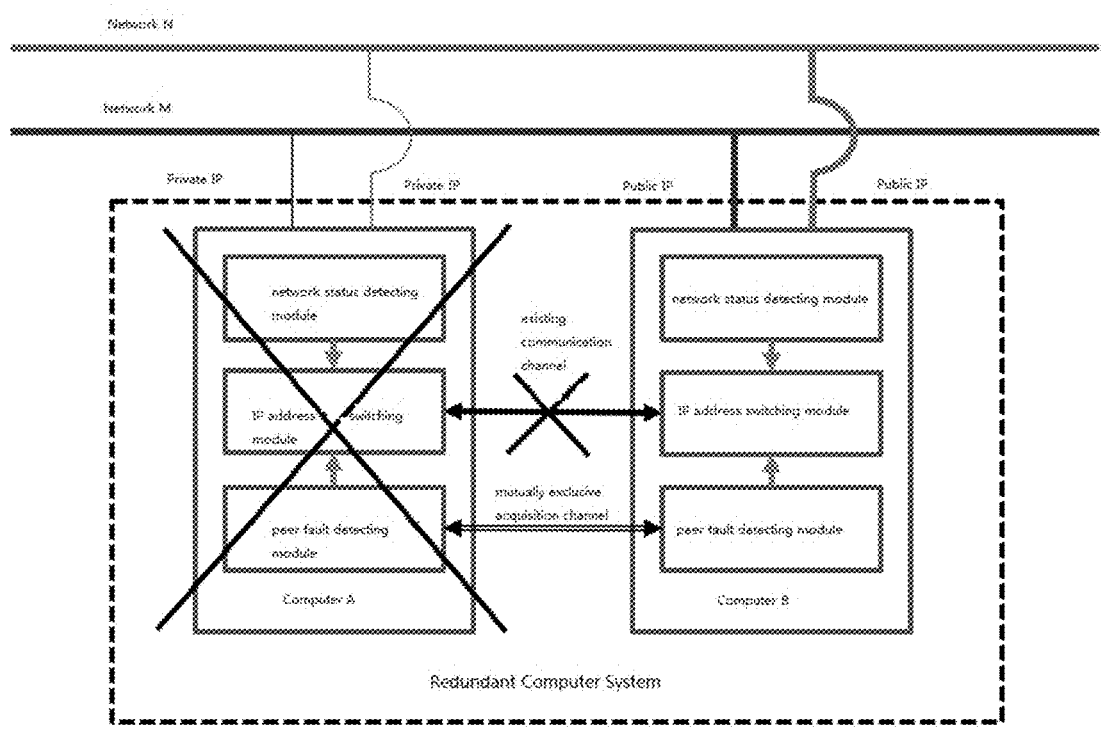
FIG. 2 is a schematic diagram of the IP address switching module at the aid of a peer fault detecting module.

In conjunction with the illustrations in FIG. 1 and FIG. 2, during normal operation, computer A in the computer group holds the public IP address of network M, and computer B holds the public IP address of network N. When computer A fails accidentally (e.g., a shut-down operation), the existing communication channel becomes untrustworthy; if computer B does not have a peer fault detecting module, the normally operating computer B cannot obtain the check information from the peer and will adopt a conservative strategy; as such, it cannot obtain the public IP address of network M held by computer A, and subsequently it can only work with the single network N. With the improved solution provided by the present disclosure, under the aid of the peer fault detecting module of computer B, computer B stably acquires that the flag bit for the relay rear node of computer A is 1 through a mutually exclusive acquisition channel when computer A is down, proving that the public IP address of network M of computer A can be obtained; afterwards, computer B continues operation with the public IP addresses of networks M and N, thereby enhancing redundancy of the whole system and meanwhile avoiding IP conflicts caused by mistaken failover.

Figure 3:
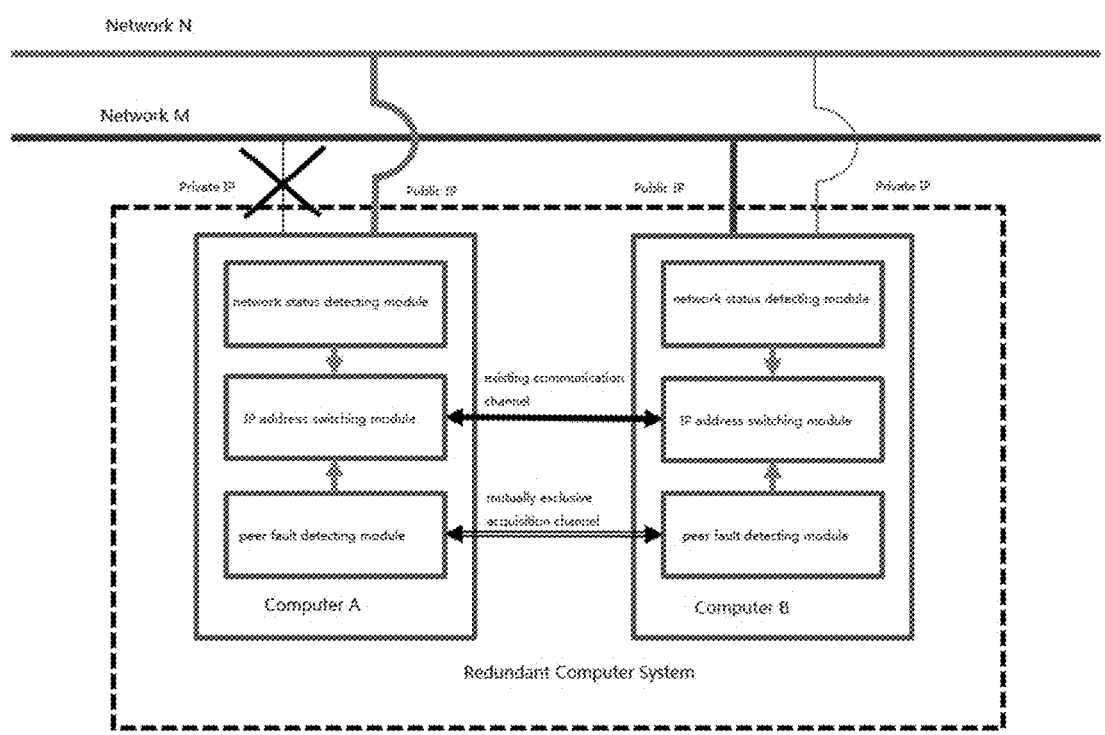
FIG. 3 is a schematic diagram of the IP address switching module under the aid of a network status detecting module.

In conjunction with the illustrations in FIG. 1 and FIG. 3, during normal operation, computer A in the computer group holds the public IP address of network M, and computer B holds the public IP address of network N. In the case that the network port for network M of computer A fails (e.g., looseness of the network cable), the network status detecting module of computer A will notify the IP address switching module of computer A to release the public IP address of network M, and then the IP address switching module of computer B enables computer B to obtain the public IP address of network M, continuously maintaining dual-network communication of the computer group with the outside. As the network port for network N of computer A is normal, in order to uniformly distribute the public IP addresses to guarantee overall reliability of the computer group, computer B needs to transfer the public IP address of network N held thereby to computer A; during the transfer process, the network status detecting module of computer B identifies health statuses of the remote device in networks M and N; if network M is better than network N, network N IP failover may be executed; if network M is worse than network N, network N IP failover is disabled. This practice may avoid the transient dual-network interruption risk for the remote device.

In view of the above, by additionally configuring a network status detecting module and a peer fault detecting module to aid the IP address switching module to allocate IP addresses more smartly, the method and system according to the present disclosure can significantly improve reliability of the redundant network and effectively reduce IP conflicts during the redundant network failover process.

Although the contents of the present disclosure have been described in detail through the foregoing preferred embodiments, it should be understood that the depictions above shall not be regarded as limitations to the present disclosure. After those skilled in the art have read the contents above, many modifications and substitutions to the present disclosure are all obvious. Therefore, the protection scope of the present disclosure should be limited only by the appended claims.

What is claimed is:

1. A redundant network IP failover system based on a redundant computer, wherein in an applicable distributed computer system, redundant computer groups communicate with each other via a plurality of network segments of a redundant network, wherein any redundant computer group includes a plurality of computers, each computer comprising an IP address switching module configured to assign an IP address to a network port and switch a redundant network IP to the network port, each computer communicating with a remote device in the redundant network via a public IP address while sharing data with peer computers in the redundant computer group via a private IP address;

each computer further comprising:
a peer fault detecting module configured to monitor, in real time, operation statuses of peer computers in the redundant computer group, and when determining operation exception of a peer computer, notify the IP address switching module of the native computer to obtain the public IP address held by the exceptional peer computer, such that the native computer continues operation with the public IP addresses corresponding to multiple network segments;

and, a network status detecting module configured to perform status detection to network ports of the native computer so as to determine status of the local network; and when determining status exception of a network port holding a public IP address on the native computer, notify the IP address switching module of the native computer to release the public IP address held by the status exceptional network port, such that the IP address switching modules of the peer computers in the redundant computer group obtain the released public IP address to maintain multi-segment communication between the native computer group and other redundant computer groups;

wherein:

the network status detecting module of each computer is further configured to detect health statuses of a remote device corresponding to different network segments in the redundant network by monitoring network connected/disconnected conditions of other redundant computer groups;

if the network status detecting module determines that the health status of the remote device corresponding to the first network segment is better than that corresponding to other network segments, the IP address switching module of the native computer is enabled to perform IP failover corresponding to the other network segments, but forbidden to simultaneously perform IP failover corresponding to the first network segment;

and if the network status detecting module determines that the health status of the remote device corresponding to the first network segment is worse than that corresponding to other segments, the IP address switching module of the native computer is forbidden to perform IP failover corresponding to the other network segments.

2. The redundant network IP failover system according to claim 1, wherein:

when identifying status exception of the network port holding the public IP address corresponding to the first network segment on the native computer, the network status detecting module notifies the IP address switching module of the native computer to release the public IP address corresponding to the first network segment, such that by information check between the IP address switching module of the native computer and the IP address switching modules of the peer computers in the native redundant computer group, the normal status network ports corresponding to the first network segment on the peer computers obtain the released public IP address corresponding to the first network segment.

3. The redundant network IP failover system according to claim 1, wherein:

when identifying status exception of the network port holding the public IP address corresponding to the first network segment on the native computer, the network status detecting module notifies the IP address switching module of the native computer to release the public IP address corresponding to the first network segment on the network port, and assigns a private IP address corresponding to the first network segment to the network port.

4. The redundant network IP failover system according to claim 1, wherein:

when the network status detecting module identifies status exception of the network port holding the public IP address corresponding to the first network segment on the native computer and a normal status network port corresponding to another network segment is present on the native computer, the network status detecting module notifies the IP address switching module of the native computer to release the public IP address corresponding to the first network segment, such that by information check between the IP address switching module of the native computer and the IP address switching modules of the peer computers in the native redundant computer group, the public IP addresses corresponding to said another network segment on the peer computers are obtained and assigned to the normal status network port corresponding to said another network segment on the native computer.

5. The redundant network IP failover system according to claim 1, wherein:

a mutually exclusive acquisition channel is provided between the peer fault detecting module of each computer and the peer fault detecting modules of the peer computers in the native redundant computer group;

and the peer default detecting module monitors a relay rear node of the peer computers in the native redundant computer group, and when stably acquiring that the flag bit for the relay rear node of the peer computers is 1, determines that the peer computers have an operation exception.

6. A redundant network IP failover method based on a redundant computer, implemented by the redundant network IP failover system based on a redundant computer according to claim 1, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

7. A redundant network IP failover method based on a redundant computer, implemented by the redundant network IP failover system based on a redundant computer according to claim 1, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

8. A redundant network IP failover method based on a redundant computer, implemented by the redundant network IP failover system based on a redundant computer according to claim 2, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

9. A redundant network IP failover method based on a redundant computer, implemented by the redundant network IP failover system based on a redundant computer according to claim 3, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

10. A redundant network IP failover method based on a redundant computer, implemented by the redundant network IP failover system based on a redundant computer according to claim 4, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

11. A redundant network IP failover method based on a redundant computer, implemented by the redundant network IP failover system based on a redundant computer according to claim 5, wherein:

during normal operation, computers in the redundant computer group maintain synchronization of data information via public and private networks and existing communication channels, and respective IP address switching module of the computers allocates public IP addresses of multiple network segments uniformly to the computers;

each computer monitors, via a peer fault detecting module and in real time, operation statuses of peer computers in the redundant computer group, and when determining operation exception of a peer computer, notifies the IP address switching module of the native computer to obtain the public IP address held by the exceptional peer computer, such that the native computer continues operation with the public IP addresses corresponding to multiple network segments;

and/or, each computer performs status detection, via a network status detecting module, to network ports of the native computer so as to determine status of the local network; and when determining status exception of a network port holding a public IP address on the native computer, notifies the IP address switching module of the native computer to release the public IP address held by the status exceptional network port, such that the IP address switching modules of the peer computers in the redundant computer group obtain the released public IP address to maintain multi-segment communication between the native computer group and other redundant computer groups.

12. A redundant network IP failover method based on a redundant computer, wherein:

any redundant computer group includes a first computer and a second computer, and communicates with other redundant computer groups via two network segments of a redundant network;

during normal operation, respective IP address switching module of the first computer and the second computer allocates public IP addresses of two network segments uniformly to the first computer and the second computer;

respective peer default detecting module of the first computer and the second computer monitors operation status of each other in real time, wherein when determining operation exception of the second computer, the peer fault detecting module of the first computer notifies the IP address switching module of the first computer to obtain the public IP address corresponding to the second network segment held by the second computer, such that the first computer continues operation with the public IP addresses of the two network segments;

and, respective network status detecting module of the first computer and the second computer monitors network status of the native computer in real time, wherein when determining fault of a network port corresponding to the first network segment in the first computer, the network status detecting module of the first computer notifies the IP address switching module of the first computer to release the public IP address corresponding to the first network segment, such that the IP address switching module of the second computer enables the second computer to obtain the public IP address corresponding to the first network segment so as to continuously maintain dual-network communication of the redundant computer group with the outside; wherein:

when the network status detecting module of the first computer determines fault of the network port corresponding to the first network segment in the first computer but normality of the network port corresponding to the second network segment in the first computer, the network status detecting module of the second computer further identifies health statuses of a remote device corresponding to the first network segment and the second network segment:

in the case that the network status detecting module of the second computer determines that the health status of the remote device corresponding to the first network segment is better than that corresponding to the second network segment, IP failover corresponding to the second network segment is allowed;

and in the case that the network status detecting module of the second computer determines that the health status of the remote device corresponding to the first network segment is worse than that corresponding to the second network segment, IP failover corresponding to the second network segment is forbidden.

13. The redundant network IP failover method according to claim 12, wherein:

the peer default detecting module of the first computer determines operation exception of the second computer when stably acquiring that the flag bit for the relay rear node of the second computer is 1, and then notifies the IP address switching module of the first computer to obtain the public IP address corresponding to the second network segment, such that the first computer continues operation with the public IP addresses of the two network segments;

and when the network status detecting module of the first computer determines fault of the network port corresponding to the first network segment in the first computer, but normality of the network port corresponding to the second network segment in the first computer, the second computer transfers the public IP address corresponding to the second network segment held by the second computer to the first computer.

* * * * *